US011990680B2

(12) United States Patent
Oh et al.

(10) Patent No.: US 11,990,680 B2
(45) Date of Patent: May 21, 2024

(54) ARRAY ANTENNA SYSTEM CAPABLE OF BEAM STEERING AND IMPEDANCE CONTROL USING ACTIVE RADIATION LAYER

(71) Applicant: SEOUL NATIONAL UNIVERSITY R&DB FOUNDATION, Seoul (KR)

(72) Inventors: Jungsuek Oh, Seoul (KR); Jaehoon Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 4 days.

(21) Appl. No.: 17/206,052

(22) Filed: Mar. 18, 2021

(65) Prior Publication Data

US 2022/0302601 A1 Sep. 22, 2022

(51) Int. Cl.

*H01Q 21/00* (2006.01)
*H01Q 3/44* (2006.01)
*H01Q 9/04* (2006.01)
*H01Q 21/06* (2006.01)
*H01Q 21/08* (2006.01)

(52) U.S. Cl.

CPC ........... *H01Q 21/0037* (2013.01); *H01Q 3/44* (2013.01); *H01Q 9/0457* (2013.01); *H01Q 21/0006* (2013.01); *H01Q 21/065* (2013.01); *H01Q 21/08* (2013.01)

(58) Field of Classification Search

CPC ........... H01Q 21/065; H01Q 13/20–28; H01Q 21/0037–0056; H01Q 3/44

See application file for complete search history.

(56) References Cited

U.S. PATENT DOCUMENTS 6,133,972 A * 10/2000 Fujimori ........... G02F 1/133377 349/86
7,492,439 B1 * 2/2009 Marshall ................... G01J 9/02 349/201
10,211,532 B2 * 2/2019 Foo ...................... H01Q 21/061
10,720,712 B2 * 7/2020 Foo .......................... H01Q 1/36
10,756,430 B2 * 8/2020 Asagi ........................ H01Q 3/44
10,950,927 B1 * 3/2021 West ....................... H01Q 1/364
11,322,843 B2 * 5/2022 Medhipour .......... H01Q 9/0457
11,429,008 B1 * 8/2022 Akselrod ................ G02F 1/292
11,450,972 B2 * 9/2022 Wang ................. H01Q 21/0075
11,454,860 B2 * 9/2022 Liu ........................ G02F 1/3544
2014/0266897 A1 * 9/2014 Jakoby ..................... H01Q 3/34 29/601
2014/0266946 A1 * 9/2014 Bily ......................... H01Q 3/22 343/771

(Continued)

*Primary Examiner* — AB Salam Alkassim, Jr

(74) *Attorney, Agent, or Firm* — Fenwick & West LLP

(57) ABSTRACT

The array antenna system according to an embodiment includes an active radiation layer including a plurality of unit cells and a control circuit to control properties of each unit cell, a plurality of patch antennas placed on each unit cell, and a feed line to feed waves for excitation of the plurality of patch antennas through the active radiation layer, wherein each unit cell is controlled to have different radiation properties by the control circuit, and beam steering and impedance control of the array antenna system is enabled by control of the active radiation layer. According to the embodiment, power consumption is much lower than the existing beamforming circuit, and the using of the single feed line reduces the complexity of system design.

5 Claims, 9 Drawing Sheets

(56) References Cited

U.S. PATENT DOCUMENTS

| | | | | |
|---|---|---|---|---|
| 2015/0109178 | A1* | 4/2015 | Hyde | H01Q 13/28 343/772 |
| 2015/0222021 | A1* | 8/2015 | Stevenson | H01Q 21/005 343/771 |
| 2015/0222022 | A1* | 8/2015 | Kundtz | H01Q 21/24 343/771 |
| 2015/0236415 | A1* | 8/2015 | Bily | H01Q 3/34 342/372 |
| 2015/0288063 | A1* | 10/2015 | Johnson | H01Q 3/24 342/368 |
| 2018/0083364 | A1* | 3/2018 | Foo | H01Q 15/0026 |
| 2018/0294557 | A1* | 10/2018 | Lu | H01Q 19/067 |
| 2019/0148824 | A1* | 5/2019 | Kitoh | H01L 27/1225 343/789 |
| 2019/0237870 | A1* | 8/2019 | Asagi | H01L 27/124 |
| 2019/0363434 | A1* | 11/2019 | Ting | H01Q 1/50 |
| 2020/0099115 | A1* | 3/2020 | Sun | H01P 1/184 |
| 2021/0050671 | A1* | 2/2021 | Stevenson | H01Q 21/0012 |
| 2021/0066772 | A1* | 3/2021 | Wu | H01Q 3/36 |
| 2021/0167486 | A1* | 6/2021 | Xu | H01Q 21/065 |
| 2021/0208430 | A1* | 7/2021 | Liu | G02F 1/1313 |
| 2021/0208472 | A1* | 7/2021 | Liu | G02F 1/1339 |
| 2021/0210843 | A1* | 7/2021 | Lu | H01Q 3/44 |
| 2021/0210851 | A1* | 7/2021 | Wu | H01P 1/184 |
| 2021/0210852 | A1* | 7/2021 | Liu | H01P 1/18 |
| 2021/0265713 | A1* | 8/2021 | Fang | H01P 1/18 |
| 2021/0408681 | A1* | 12/2021 | Suzuki | H01Q 1/50 |
| 2022/0021094 | A1* | 1/2022 | Wu | G02F 1/1313 |
| 2022/0037785 | A1* | 2/2022 | Okita | H01Q 3/44 |
| 2022/0059913 | A1* | 2/2022 | Wu | H01Q 3/36 |
| 2022/0102863 | A1* | 3/2022 | Shekhar | H01Q 3/44 |
| 2022/0102873 | A1* | 3/2022 | Wang | H01Q 21/065 |
| 2022/0140457 | A1* | 5/2022 | Wang | G02F 1/1306 333/161 |
| 2022/0140461 | A1* | 5/2022 | Wang | G02F 1/13394 333/161 |
| 2022/0140491 | A1* | 5/2022 | Wang | H01Q 9/0442 343/907 |
| 2022/0384961 | A1* | 12/2022 | Chang | H01Q 15/148 |
| 2023/0098813 | A1* | 3/2023 | Fang | H01Q 3/36 342/372 |
| 2023/0361466 | A1* | 11/2023 | Tang | H01Q 21/0075 |

* cited by examiner

ARRAY ANTENNA SYSTEM CAPABLE OF BEAM STEERING AND IMPEDANCE CONTROL USING ACTIVE RADIATION LAYER

BACKGROUND

1. Field

The present disclosure relates to an antenna system, and more particularly, to an antenna system capable of antenna beam steering and impedance control using an active radiation layer capable of individually controlling each unit.

2. Description of the Related Art

Recently, there is a tendency toward increased operating frequency in not only mobile communication but also many applications. As the frequency increases, signal loss increases with the increasing movement distance, and thus an array antenna including multiple radiators (patch antenna) is widely used to increase antenna gain. The array antenna can improve the antenna gain through constructive interference between the radiators.

In general, an array antenna system controls the output direction of an antenna beam by controlling the phase of waves fed to the radiators. A feed line and a phase shifter individually connected for each radiator are necessary to implement a beam steering system, for example, a radio frequency integrated circuit (RFIC) beamforming circuit. Additionally, an impedance mismatch caused by the antenna external factor may reduce the antenna gain and output properties, so an impedance tuner is necessary to solve the impedance mismatch of each radiator.

However, as the number of radiators increases, the array antenna structure has an increase in the number of components (the respective feed line, phase shifter and impedance tuner) of the beamforming circuit, causing very high power consumption and radio frequency (RF) losses. Accordingly, there is a need for an array antenna system capable of antenna beam steering and impedance control without high power consumption or losses.

SUMMARY

The present disclosure is directed to providing an array antenna system capable of beam steering and impedance control through antenna reconfiguration without a phase shifter or an impedance tuner used in a radio frequency integrated circuit (RFIC) beamforming circuit.

An array antenna system according to an embodiment of the present disclosure includes an active radiation layer including a plurality of unit cells and a control circuit to control properties of each unit cell, a plurality of patch antennas placed on each unit cell, and a feed line to feed waves for excitation of the plurality of patch antennas through the active radiation layer, wherein each unit cell is controlled to have different radiation properties by the control circuit, and beam steering and impedance control of the array antenna system is enabled by control of the active radiation layer.

According to an embodiment, the unit cell may include a liquid crystal having varying dielectric constant depending on applied voltage, and the control circuit may control radiation amplitude and phase of each unit cell or control the impedance by independently applying voltage for each unit cell to change the dielectric constant of the liquid crystal.

According to an embodiment, as the dielectric constant of the liquid crystal changes, an effective wavelength of the patch antenna changes, and as the effective wavelength changes, the amplitude and phase of the waves radiating in free space at a particular frequency change.

According to an embodiment, the liquid crystal has an increasing dielectric constant with the increasing applied voltage.

According to an embodiment, the height of each unit cell may be set to a few tens to a few hundreds of μm.

The array antenna system according to an embodiment has the active radiation layer placed below the patch antenna to independently control the radiation properties of each unit cell. According to an embodiment, it is possible to achieve antenna beam steering and impedance control using the active radiation layer. The existing method accomplishes beam steering or solves an impedance mismatch through a phase shifter or an impedance tuner connected for each radiator, but its disadvantage is a significant increase in power consumption and radio frequency (RF) losses with the increasing number of radiators. According to an embodiment, it is possible to achieve beam steering and impedance control using the active radiation layer made of reconfigurable elements and materials without additional RF elements, thereby significantly reducing the power consumption and losses. Additionally, the use of the single feed line reduces the complexity of system design.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and are not intended to be limiting of the present disclosure. Additionally, for clarity of description, illustration of some elements in the drawings may be exaggerated and omitted.

DETAILED DESCRIPTION

Figure 1:
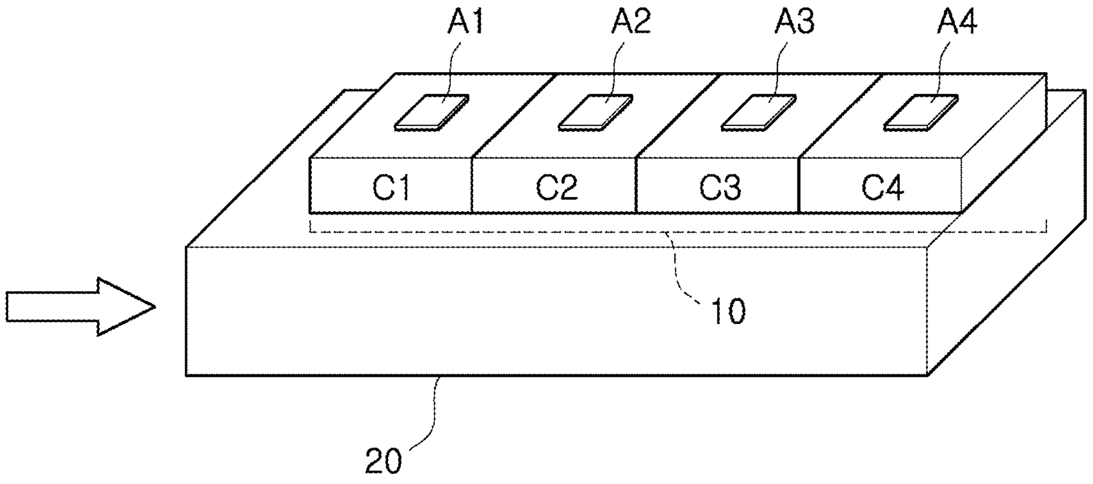
FIG. 1 shows the structure of an array antenna system having an active radiation layer according to an embodiment.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be defined based on the meaning of the terms and the context throughout the specification, rather than simply the name of the terms.

Hereinafter, the preferred embodiments of an array antenna system capable of beam steering and impedance control will be described in detail with reference to the accompanying drawings.

FIG. 1 shows the structure of an array antenna system according to an embodiment. The array antenna system according to an embodiment includes an active radiation layer 10 including a plurality of unit cells C1, C2, C3, C4, . . . and a control circuit to control the properties of each unit cell; a plurality of patch antennas A1, A2, A3, A4, . . . placed on each unit cell; and a feed line 20 to feed waves for excitation of the plurality of patch antennas A1, A2, A3, A4, . . . through the active radiation layer 10. Although not shown for clarity, the array antenna system may further include essential or optional elements that make up antenna systems.

The active radiation layer 10 includes the unit cells C1, C2, C3, C4, . . . and the control circuit to control the properties of each unit cell. A unit radiator including each unit cell and a patch antenna placed thereon acts as a metamaterial for the waves. The unit cells C1, C2, C3, C4, . . . include reconfigurable elements or materials (for example, a PIN diode, a varactor, a liquid crystal).

In the specification, the reconfigurable antenna refers to an antenna capable of modifying the operating frequency or radiation properties in a controlled and reversible manner. When the reconfigurable antenna is applied to the array antenna system, it is possible to accomplish beam steering by controlling the radiation properties through antenna reconfiguration without any additional element such as a phase shifter.

Figure 2:
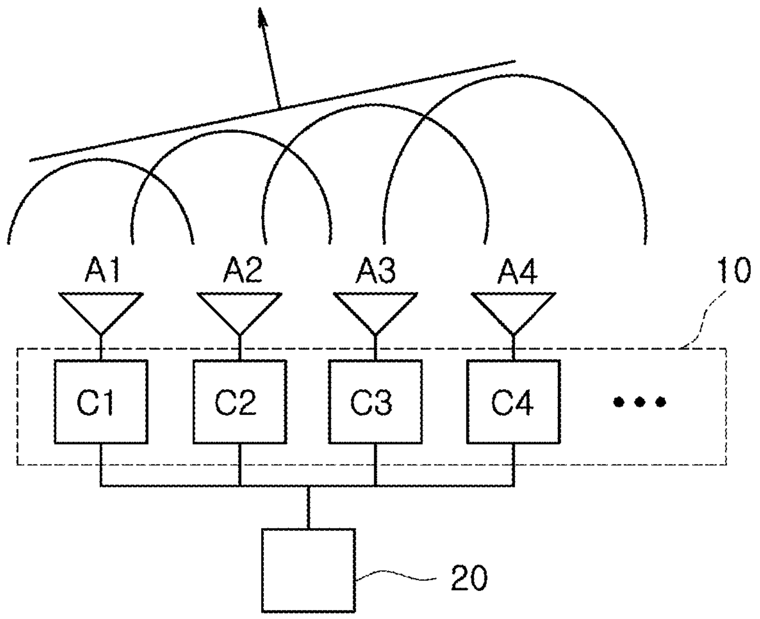
FIG. 2 is a diagram for describing the working mechanism of an array antenna system according to an embodiment.

FIG. 2 is a diagram for describing the working mechanism of the array antenna system according to an embodiment. Referring to FIG. 2, the unit cells C1, C2, C3, C4, . . . that make up the active radiation layer 10 are controlled to have independent radiation properties by the waves fed by the single feed line 20 and the control circuit, and accordingly, the phase of the waves outputted from the patch antennas A1, A2, A3, A4, . . . placed on each unit cell changes. In this way, it is possible to steer the main beam by making a phase difference to the adjacent radiators.

The feed line 20 includes a first end that extends in a first direction, a second end that extends in the first direction and is spaced apart from the first end, and an upper surface that is between the first end and the second end and extends in a second direction that is different from the first direction. The row of the plurality of unit cells C1, C2, C3, C4, . . . is arranged on the upper surface of the feed line 20. The waves going into the left side (e.g., the first end) of the feed line 20 excite the top patch antenna that are on the row of the plurality of unit cells C1, C2, C3, C4, . . . through a slot while traveling to the right side (e.g., the second end). The antenna radiation layer radiates in the broadside direction through interaction with the waves. The slot may be designed in various shapes, for example, a rectangular shape, an H-shape, an L-shape, and it may be designed to have a plurality of slots for each unit cell. Each patch antenna A1, A2, A3, A4, . . . may be made in various shapes (rectangular, circular, Bowtie, etc.).

According to an embodiment, the unit cells C1, C2, C3, C4, . . . include a liquid crystal having varying dielectric constant depending on the applied voltage, and the control circuit is configured to control the radiation amplitude and phase of each unit cell or control the impedance by independently applying voltage for each unit cell to change the dielectric constant of the liquid crystal.

Figure 3:
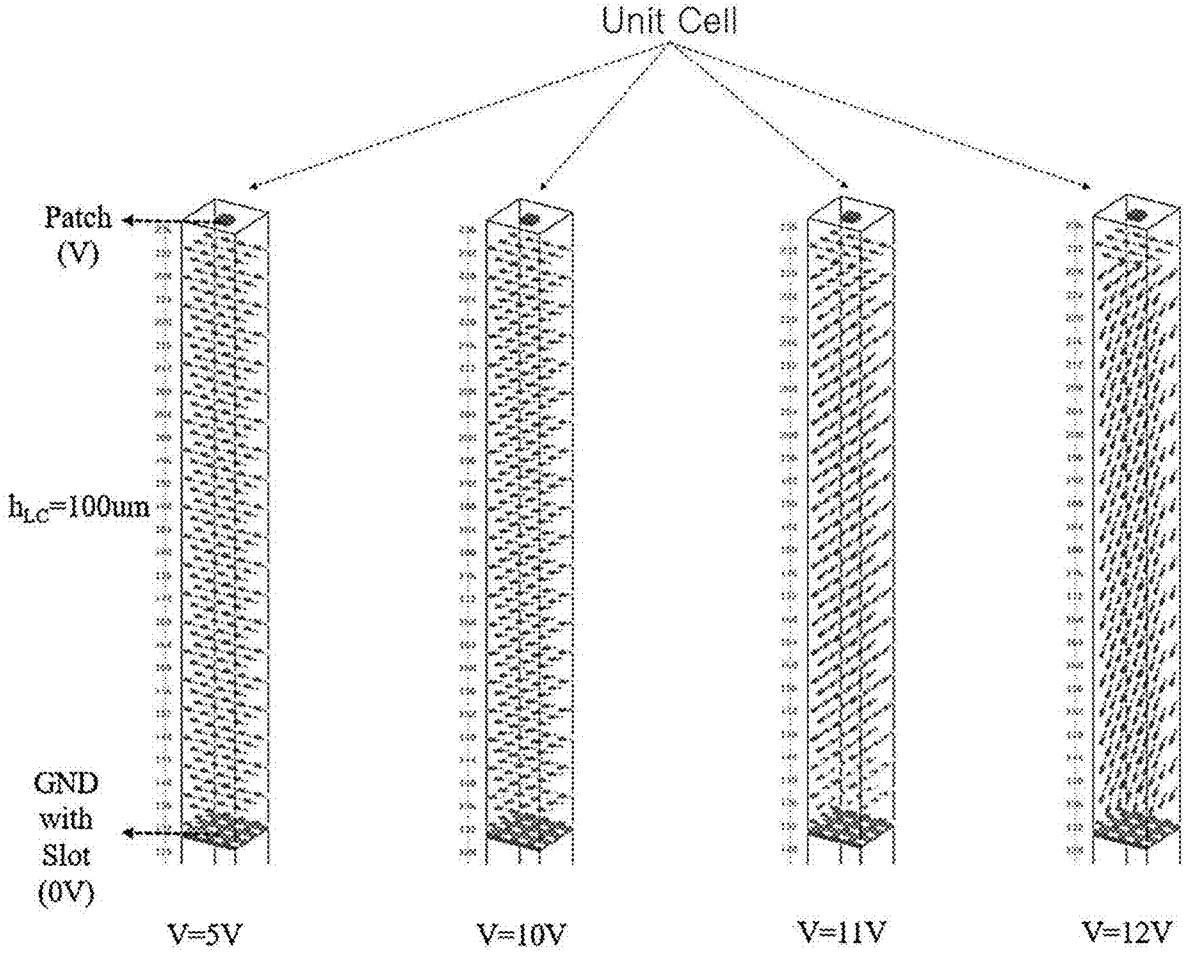
FIG. 3 shows changes in structure of liquid crystal molecules as a function of voltage applied to a unit cell of an active radiation layer according to an embodiment.

FIG. 3 shows changes in the structure of liquid crystal molecules as a function of voltage applied to the unit cell of the active radiation layer according to an embodiment. The unit cell forms a unit radiator with the patch antenna placed on top. The height of the unit cell may be set to a few tens to a few hundreds of μm, and although FIG. 3 shows the unit cell having the height of 100 um, the height is not limited to a particular value. For example, the unit cell may be designed to have the height of 200 μm or more.

As shown in FIG. 3, it can be seen that the array of liquid crystal molecules changes depending on the magnitude of DC voltage (Vdc=5, 10, 11, 12 V) applied between the top and the bottom of the liquid crystal layer of the unit cell. In the positive liquid crystal, the molecules are arranged perpendicular to the direction of the electric field. An average direction of the liquid crystal molecules of a rod structure is a director of the liquid crystal, and the dielectric constant of the liquid crystal is determined by the direction of the director. When there is no electric field (i.e., V=0), the director of the liquid crystal is disposed in the horizontal direction, and in this instance, the liquid crystal has a minimum of dielectric constant. As the intensity of the electric field is higher by the high DC voltage, the director is disposed closer to the vertical direction (i.e., a direction parallel to the electric field) and the dielectric constant is higher.

In the above embodiment, the dielectric constant of the liquid crystal may be represented as a function of voltage, and accordingly it is possible to control the dielectric constant of the liquid crystal serving as a substrate of the radiator by independently applying voltage. In other words, it is possible to control the output properties (amplitude and phase) of the patch antenna by applying voltage to the unit cell, thereby controlling the output direction of the beam.

Figure 4A:
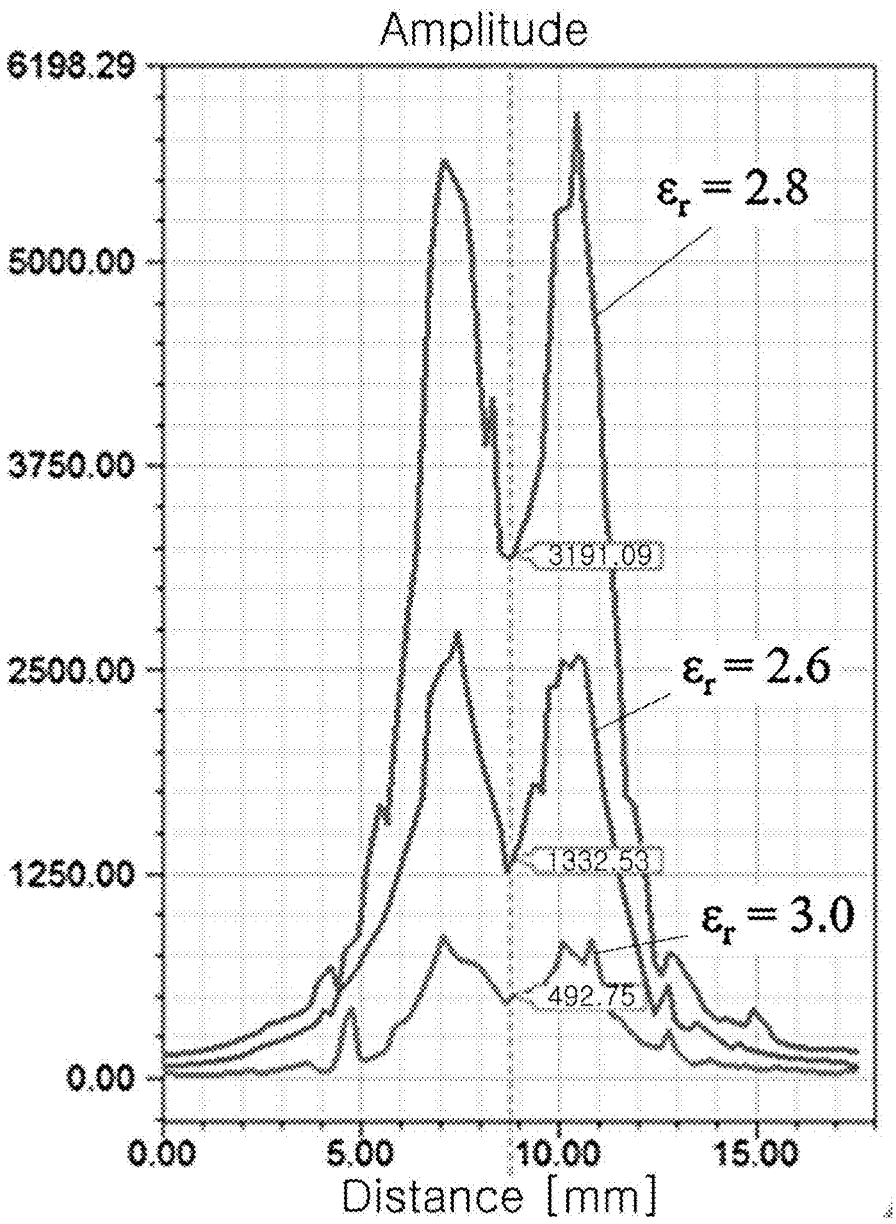
FIGS. 4A and 4B are graphs showing the radiation amplitude and phase with changes in dielectric constant in a unit cell according to an embodiment.
Figure 4B:
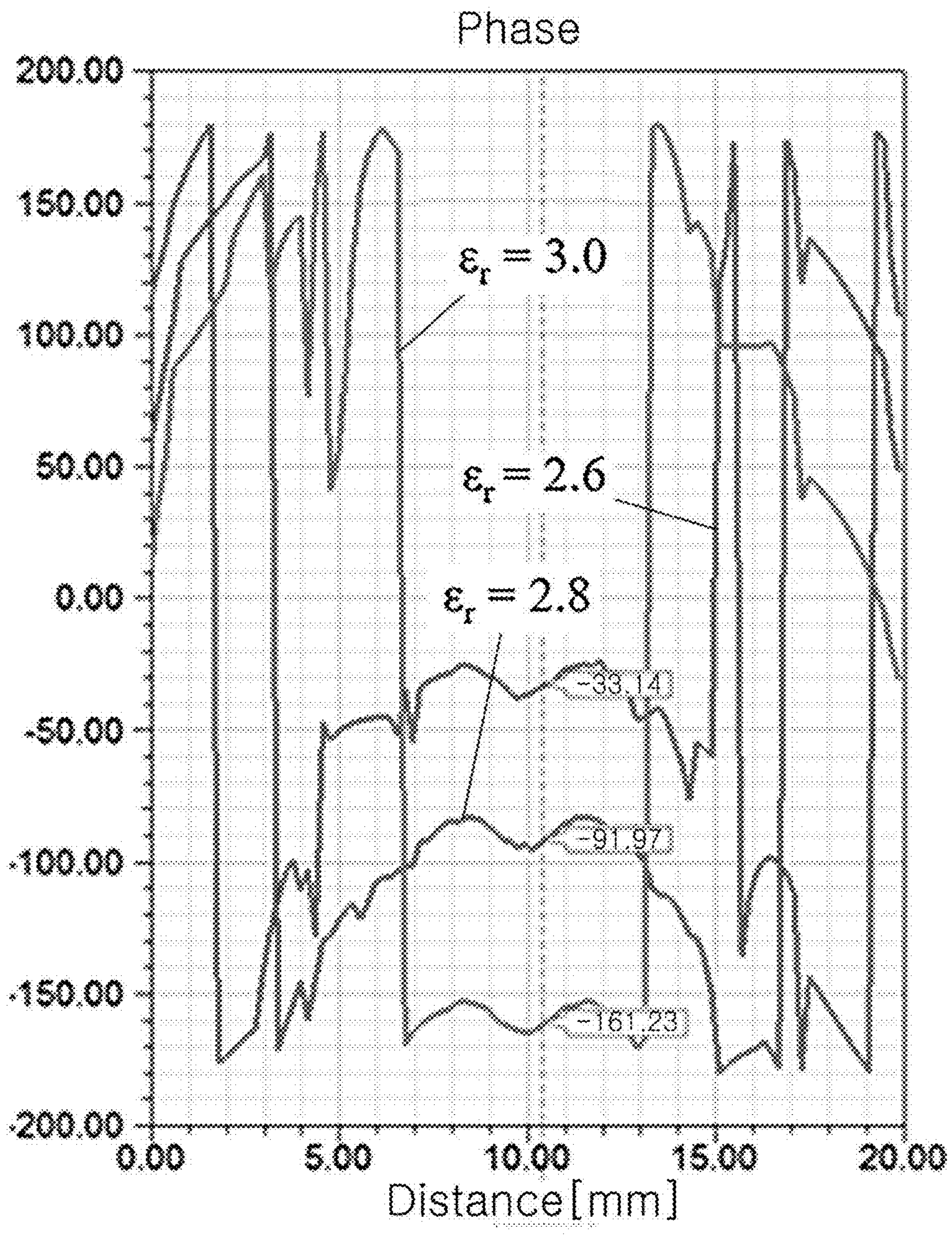

FIGS. 4A and 4B show the radiation amplitude and phase with changes in the dielectric constant of the liquid crystal in each unit cell. Since the liquid crystal serves as a substrate of the patch antenna, when the dielectric constant changes, the effective wavelength changes. As the effective wavelength changes, the RLC parameters on an equivalent circuit for a target frequency change, and accordingly, the amplitude and phase of waves radiating in free space also change. It is possible to allow the reconfiguration for beamforming using the properties of the metamaterial.

Figure 5A:
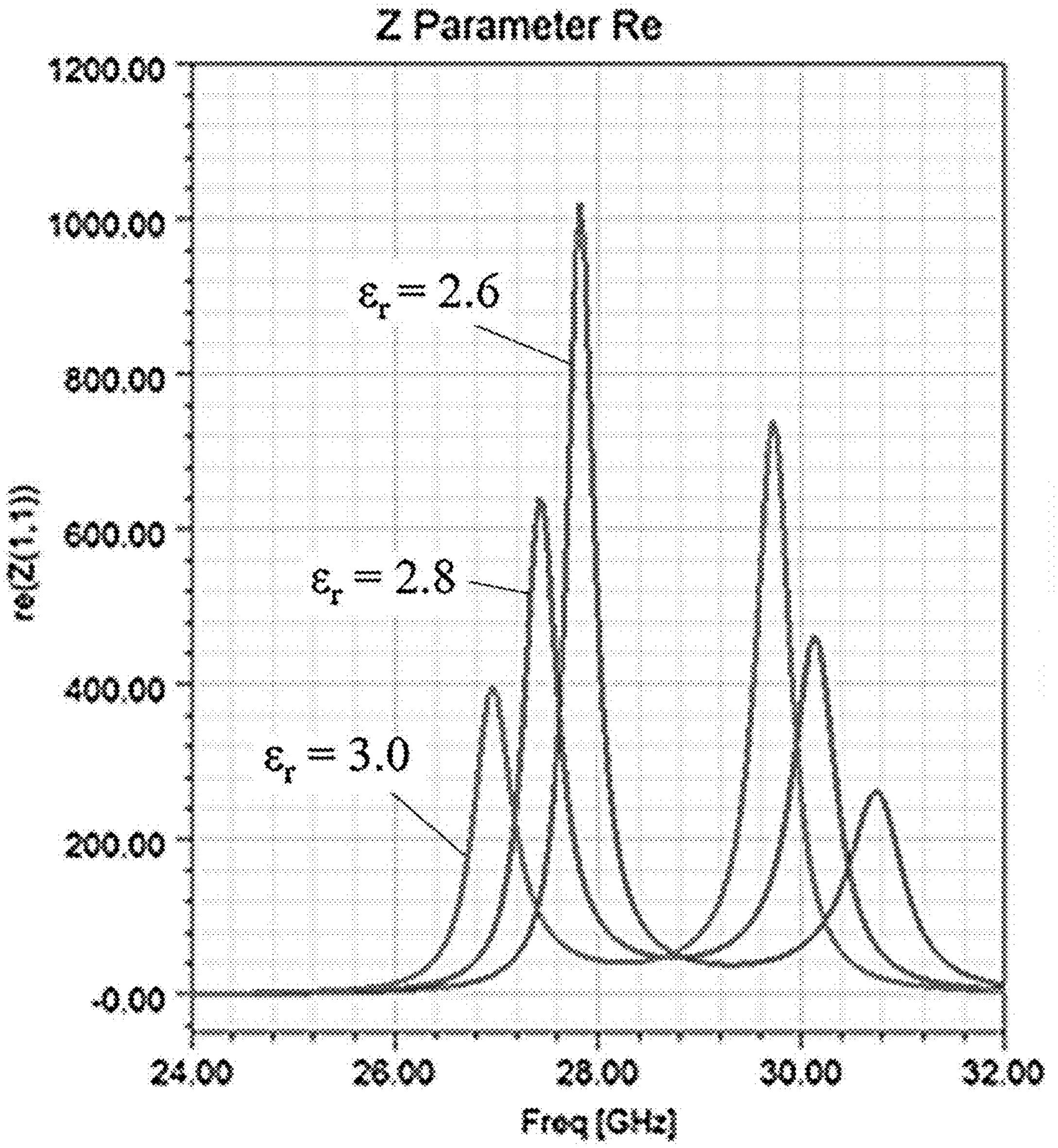
FIGS. 5A and 5B are graphs showing changes in real and imaginary parts of impedance with changes in dielectric constant in a unit cell according to an embodiment.
Figure 5B:
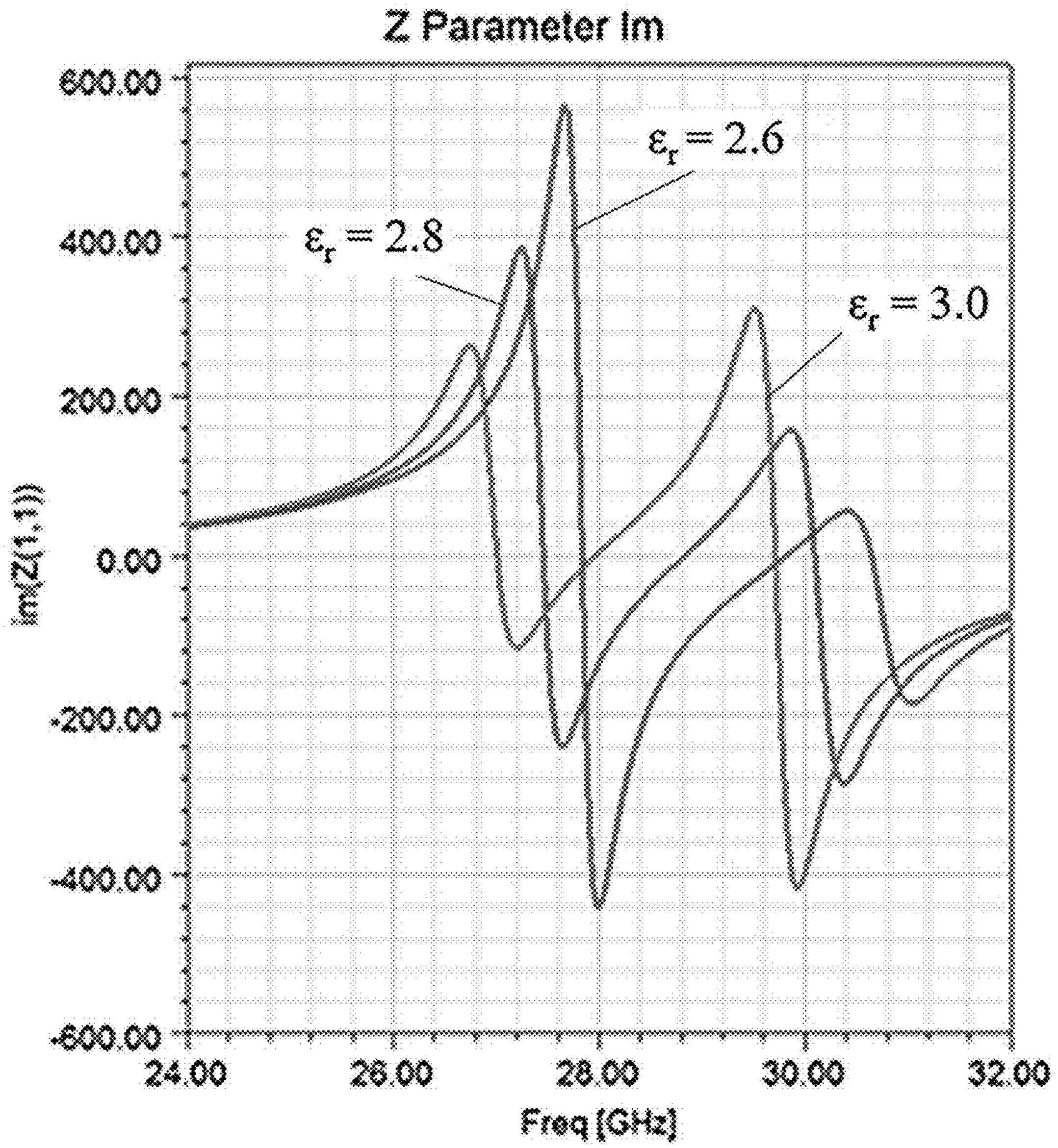

FIGS. 5A and 5B show changes in the real and imaginary parts of the impedance with changes in dielectric constant of the liquid crystal in each unit cell. As the dielectric constant of the liquid crystal changes, the value of the RLC elements that make up the equivalent circuit of the antenna changes, and accordingly the values of the real and imaginary parts of the impedance viewed from the input end change. It represents that it is possible to control the impedance of the antenna system by controlling the voltage applied to each unit cell. The existing system needs a separate circuit serving as an impedance tuner to solve an impedance mismatch caused by an external factor, but according to this system, it is possible to achieve impedance matching by controlling the voltage applied to the unit cell. Accordingly, it is possible to prevent additional power consumption by an element such as an impedance tuner.

Figure 6A:
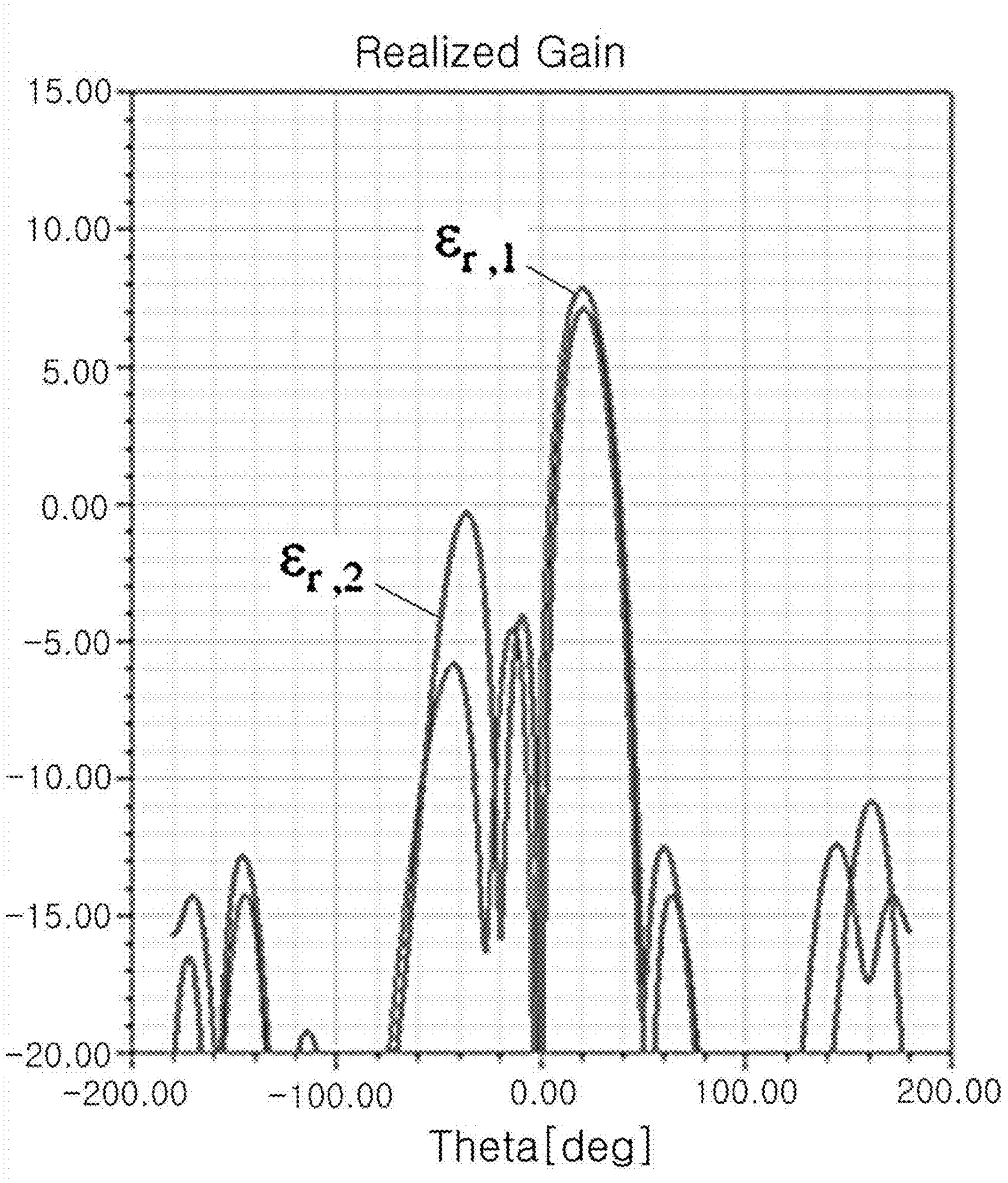
FIG. 6A shows a beam pattern by dielectric constant combinations having a main beam of the same direction.
Figure 6B:
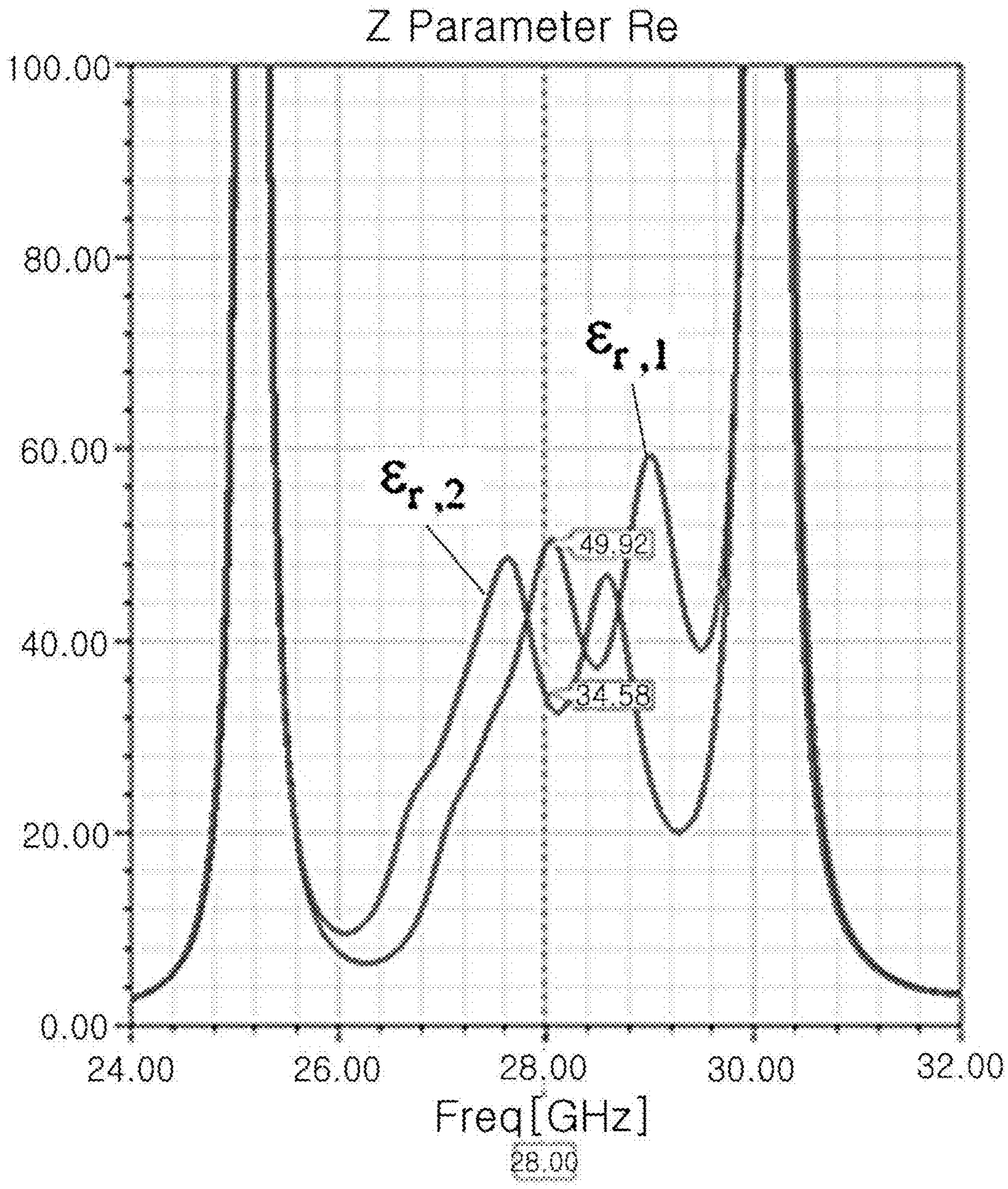
FIG. 6B is a graph showing changes in real part of an input impedance by dielectric constant combinations.

FIG. 6A shows a beam pattern by dielectric constant combinations having the main beam of the same direction, and FIG. 6B is a graph showing changes in the real part of the input impedance by the dielectric constant combinations. Referring to FIGS. 6A and 6B, it can be seen that two different dielectric constant combinations form the main beam steered about 30°+theta direction equally in the radiation pattern, and at the same time, have different input impedances. That is, it is possible to steer the beam in a desired direction, and at the same time, differently set the impedance. Accordingly, it is possible to solve an impedance mismatch caused by an external factor through the control of the active radiation layer without a circuit serving as an impedance tuner in the RFIC.

Figure 7:
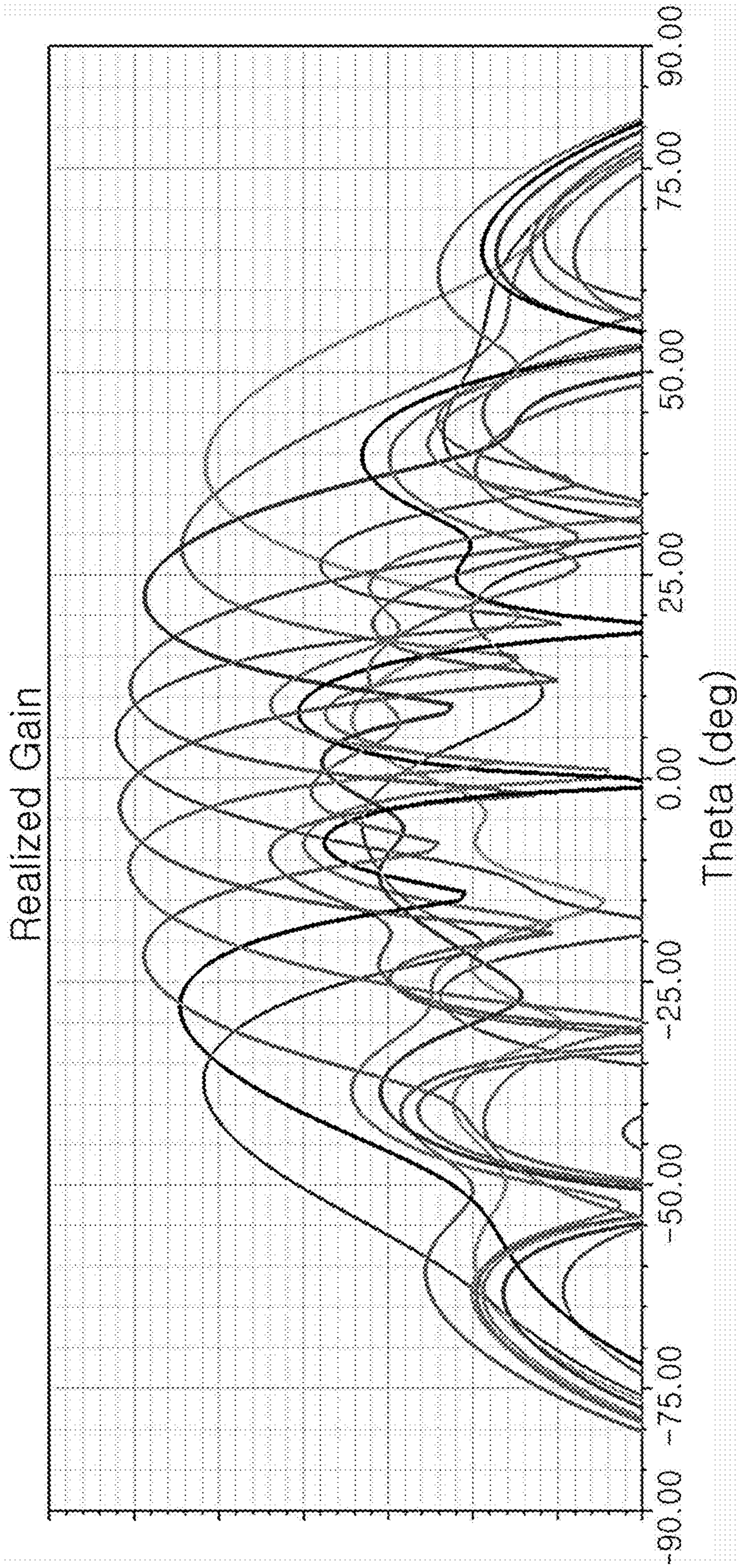
FIG. 7 is a graph showing a beam steering radiation pattern of an antenna system according to an embodiment.

FIG. 7 is a graph showing the beam steering radiation pattern of the antenna system according to an embodiment. The graph of FIG. 7 shows that it is possible to achieve antenna beam steering without a separate phase shifter. It is possible to steer the beam in all directions through multiple dielectric constant combinations of the unit cells, and at the same time, control the impedance as described above.

According to the array antenna system described above, it is possible to achieve beam steering and impedance control using the active radiation layer capable of independently control the radiation properties of each unit cell through the single feed line. The existing method accomplishes beam steering or controls an impedance mismatch through a phase shifter or an impedance tuner connected for each radiator, but its disadvantage is a significant increase in power consumption and RF losses with the increasing number of radiators. According to an embodiment, it is possible to achieve beam steering and impedance control without RF components using the active radiation layer made of materials having varying dielectric constant depending on the applied voltage such as the liquid crystal and significantly reduce the power consumption and losses. Additionally, the use of the single feed line reduces the complexity of system design.

While the present disclosure has been hereinabove described with reference to the embodiments, those skilled in the art will understand that various modifications and changes may be made thereto without departing from the spirit and scope of the present disclosure defined in the appended claims.

What is claimed is:

1. An array antenna system capable of beam steering and impedance control, the array antenna system comprising:

an active radiation layer including a row of a plurality of unit cells and a control circuit to control properties of each unit cell from the plurality of unit cells, the row of the plurality of unit cells including a first unit cell and a second unit cell that is adjacent to the first unit cell in the row without another unit cell from the plurality of unit cells between the first unit cell and the second unit cell;

a plurality of patch antennas on the row of the plurality of unit cells, the plurality of patch antennas including a first patch antenna placed on the first unit cell and a second patch antenna placed on the second unit cell; and a single feed line including a first end that extends in a first direction, a second end that extends in the first direction and is spaced apart from the first end, an upper surface that is between the first end and the second end and extends in a second direction that is different from the first direction, and one or more slots, wherein the row of the plurality of unit cells is arranged on the upper surface of the single feed line and the first end is configured to receive waves that propagate from the first end to the second end and excite the plurality of patch antennas that are on the row of the plurality of unit cells through the active radiation layer and the one or more slots, wherein the first unit cell includes a first liquid crystal and the second unit cell includes a second liquid crystal that is physically separated from the first liquid crystal, the first liquid crystal having a dielectric constant that varies based on an applied voltage to the first unit cell, and the second liquid crystal having a dielectric constant that varies based on applied voltage to the second unit cell, wherein the control circuit applies a first voltage to the first unit cell such that the first liquid crystal has a first dielectric constant based on the first voltage and the first unit cell emits a wave having a first radiation property based on the first dielectric constant of the first liquid crystal, and the control circuit applies a second voltage to the second unit cell that is different from the first voltage such that the second liquid crystal has a second dielectric constant that is different from the first dielectric constant based on the second voltage and the second unit cell emits a wave having a second radiation property that is different from the first radiation property based on the second dielectric constant of the second liquid crystal, and beam steering and impedance control of the array antenna system is enabled by control of the active radiation layer such that the first unit cell and the second unit cell radiate a beam pattern in a broadside direction with respect to the single feed line and the beam pattern is controlled by a combination of the first dielectric constant of the first unit cell and the second dielectric constant of the second unit cell, wherein the control circuit controls radiation properties of waves emitted by the plurality of unit cells including radiation amplitude and phase, and controls the impedance of the plurality of unit cells for impedance matching without a separate impedance tuner by independently applying different voltages to the plurality of unit cells.

2. The array antenna system according to claim 1, wherein as the dielectric constant of the liquid crystal changes, an effective wavelength of the respective patch antenna changes, and as the effective wavelength changes, the radiation amplitude and phase of the waves radiating in free space at a particular frequency change.

3. The array antenna system according to claim 1, wherein the dielectric constant of the first liquid crystal and the dielectric constant of the second liquid crystal increases with increasing applied voltage.

4. The array antenna system according to claim 1, wherein each of the plurality of unit cells is tens of μm to hundreds of μm in height.

5. The array antenna system according to claim 1, where the one or more slots includes a plurality of slots for each of the plurality of unit cells.

* * * * *